ns Patent Office
3,092,619
Patented June 4, 1963

1

3,092,619
HIGH MOLECULAR CARBOHYDRATE ETHER
CARBOXYLIC ACID ESTERS
Rudolf Köhler, Dusseldorf, and Hans-Hellmut Grun and Horst Kosche, Dusseldorf-Holthausen, Germany, assignors to Henkel & Cie G.m.b.H., Dusseldorf-Holthausen, Germany, a corporation of Germany
No Drawing. Filed Dec. 20, 1955, Ser. No. 554,146
Claims priority, application Germany Dec. 22, 1954
2 Claims. (Cl. 260—231)

This invention relates to and has as its object the production of water soluble high molecular weight carbohydrate ether carboxylic acid esters which are excellently suited as adhesives, protective colloids, thickeners, dispersing and emulsifying agents, color agglutinates and for many other purposes.

In accordance with the invention, it has been found that free ether carboxylic acids of high molecular weight carbohydrates may be converted into esters by reaction with an epoxide. The reaction is one in which the epoxide esterifies with a carboxylic group of the free acid. In this connection it should be noted that the carboxylic acids of the high molecular weight carbohydrates must be in the form of the free acids and if the same are in the form of the corresponding salts, as for example the sodium salts, this esterification will not occur and the esters which are produced in accordance with the invention will not be formed. The salts which are not operable in accordance with the invention are often referred to as celluloses, as for example the sodium cellulose glycolate is often referred to as carboxyl methyl cellulose.

High molecular weight carbohydrates, the ether carboxylic acids of which may be used as starting materials in accordance with the invention include, for example, cellulose, starch, inulin, mannan, dextran, galactan, and similar materials.

The ether carboxylic acids may be obtained from carbohydrates in the conventional manner, as for example by reacting the alkalized carbohydrates with salts of halogen carboxylic acids or by reacting the carbohydrates with acrylo or methacrylo nitrile followed by saponification. The carboxylic acid portion of the ethers may contain 2 to 4 carbon atoms. The quantity of ether carboxylic acid radicals may be 0.4–3 radicals per carbohydrate radical and preferably 0.5–1.5 radicals per carbohydrate radical.

The high molecular weight carbohydrates prior to the etherization may be pretreated mechanically as, for example by comminution or homogenization, and/or chemically as for example with acids or oxidation agents provided that after the treatment the same may still be considered high molecular weight products on the basis of the degree of polymerization which may not be substantially below 100. The carbohydrate ether carboxylic acids serving as the starting material for the process of the invention may also be treated in the same manner as the carbohydrates.

In connection with the individual carbohydrates, products of different origin may be used. Thus, for example, the cellulose may come from trees, particularly from beech or pine, or may, for example, come from straw, cotton, etc. The ether carboxylic acids or the carbohydrates used to prepare the same may also contain other ether radicals, particularly those which do not contain any acid group, as for example, methyl-, ethyl- or oxyethyl radicals. The number of these additional radicals may vary between 0 and 3—$n$ in which $n$ is the number of ether carboxylic acid radicals bound to each carbohydrate unit. Generally, however, not more than 1.8 radicals, and preferably not more than one radical per carbohydrate unit should be present.

2

The carbohydrate ether carboxylic acids which will hereinafter, for the sake of simplicity, be referred to as ether carboxylic acids, are reacted with the epoxy compounds in a water containing swollen state. The wet ether carboxylic acid should contain at least 5% by weight of water and may contain considerably higher amounts of water, as for example a water content up to 85%. The water content is, however, preferably within the range of 20 to 60% by weight. If the reaction with the epoxy compound is effected directly after the production of the ether carboxylic acids, the water containing swollen ether carboxylic acids may be obtained in a simple manner by acidifying the moist ether carboxylates obtained as a crude product or their aqueous solutions or paste with strong acids and particularly inorganic acids. If the free ether carboxylic acids are sufficiently water insoluble they separate out in this connection. If the same are relatively water soluble, the separation can be effected or completed by the addition of water soluble organic solvents such as lower alcohols. After such a treatment a final washing using water or water-containing organic solvents is preferable.

When starting with dry ether carboxylates such as are commercially available in powder form, the same are first dissolved in water to form viscous solutions or paste and then worked in the same manner as a freshly prepared and possibly still moist ether carboxylates. Free, completely dry ether carboxylic acids are relatively difficult to convert into a swollen state with water. It is therefore advisable to prepare aqueous solutions of their salts from such free acids and to obtain the swollen free acids therefrom.

In order to obtain the maximum esterification of the COOH-group it has been found preferable to use ether carboxylic acids which do not have too high a content of neutral salts, particularly alkali salts. Neutral salts are produced, for example, upon reaction of the alkalized high molecular carbohydrates with the halogeno fatty acids. Furthermore, alkali salts are produced upon the conversion of ether carboxylates into free ether carboxylic acid. If this conversion is effected in a relatively dilute solution such as a 0.5 to 5% solution sufficient supernatent liquid which is not found in the swollen ether carboxylic acid is generally present so that the neutral salts will dissolve therein and may be removed by filtering off possibly after the addition of a water soluble organic solvent. If, however, higher concentrations are used or if salt containing unpurified ether carboxylic acids such as are obtained as raw products from the production are used, the quantity of neutral salts present may be substantially larger. In such cases it is advisable to wash the neutral salts out from the swollen free ether carboxylic acids for which purpose there may be used, depending upon the solubility properties of the ether carboxylic acids, water or mixtures of water and water soluble organic solvents such as methyl or ethyl alcohol or acetone, in which connection the mixture ratio of water and solvent may vary as desired depending upon the nature of the ether carboxylic acid and the solubility of the salt. The content of the neutral salt should be kept in amount below 1 mol per mol of COOH-group and preferably below 0.1 mol per mol of COOH-group. Excess water can be removed from the swollen ether carboxylic acids by treatment with alcohol, squeezing, evacuation, evaporation or other known means.

The action of the ether carboxylic acids with the epoxide compounds causing esterification of a free carboxylic acid group by the epoxide compound is effected under conditions of temperature and pressure at which the epoxide compound is present in the fluid, i.e. liquid or gaseous state.

The epoxide compounds which may be used for the esterification are preferably low molecular water soluble alkyl epoxides having two or three carbon atoms in the molecule such as ethylene oxide, propylene oxide or glycide. It is, however, possible to use higher epoxides as, for example, those having up to 20 carbon atoms or more in the molecule. Examples of such higher epoxides include epoxides of the butanes, pentanes or hexanes.

The reaction temperature for the esterification should lie above 0° C. and preferably above 5° C. and may range up to about 100° C. through it is advisable not to exceed a temperature of about 70° C. since at higher temperatures a degradation of the high molecular weight carbohydrates or the ether carboxylic acids obtains therefrom may be expected. It has been found preferable to operate within the temperature range of about 20 to 40° C. The reaction should be effected under such pressure that the epoxides are in a fluid state. Thus it is possible to work at reduced or elevated pressure or at normal pressure. The reaction times range from about 10–80 hours but preferably between about 20 and 50 hours depending upon the reaction temperature employed, but in special cases shorter or longer reaction periods may be used. The reaction is preferably effected by merely allowing the reactants to stand though the reaction mixture may be stirred, kneaded or mechanically worked in any other desired manner.

The reaction is believed to proceed with the formation of a glycol ester by the addition of the epoxide to the carboxyl group. In this manner the cellulose glycolic acid ethylene ester is obtained, for example, from cellulose glycolic acid and ethylene oxide, the cellulose glycolic acid-propylene ester is obtained from cellulose glycolic acid and propylene oxide, and the cellulose glycolic acid-glycerine ester is obtained from cellulose glycolic acid and glycide.

In the reaction between cellulose glycolic acid and an epoxide, it is possible that polyethers will also be formed by the addition of further epoxide radicals to hydroxyl groups and in particular the free hydroxyl group of the alcohol radical.

The working up of the esters produced in accordance with the invention is extremely simple since no undesirable by-products such as neutral salts are produced during the reaction. The unreacted epoxide can be poured off with any supernatant water present and the reaction product can then be dried in any desired manner, with temperatures above 70° C. being preferably afforded in order to avoid degradation.

The properties of the new esters produced in accordance with the invention depend largely upon the origin of the carbohydrate structure, its degree of polymerization, the quantity of ether carboxylic acid radicals or other radicals bound through an ether linkage which are present, and, in particular, on the degree of esterification. The high electrolyte resistance of partially esterified ether carboxylic acids can even be noted with low degrees of conversion in which, for example, 20% of the free carboxyl groups present are esterified, and increases at first with an increase in the degree of esterification. Thus, for example, a cellulose glycolic acid which has been esterified with ethylene oxide and has 0.6 to 0.7 ether carboxylic acid radicals per glucose radical 40 to 50% of which have been esterified with the ethylene oxide forms upon being dissolved in water a highly viscous solution which, in contradiction to the solutions of the corresponding sodium cellulose glycolate are substantially more resistant to acids and to salts of polyvalent cations.

Solutions of such partial esters of ether carboxylic acids are suitable for example as adhesives, protective colloids, thickeners, dispersing and emulsifying agents, color agglutinates, and for many other purposes. Partial esters of higher glycols are surface active agents and thus can advantageously be used as foam stabilizers, protective colloids and the like.

Products in accordance with the invention which have their carboxyl groups practically completely esterified with ethylene glycol or propylene glycol will swell in water but are not soluble therein. These esters are valuable intermediates for further reactions.

The following examples are given by way of illustration and not limitation.

*Example 1*

By reacting cellulose with chloroacetic acid in the presence of alkali, the sodium salt of a celluloseglycolic acid is prepared in accordance with known methods which salt contains 0.55 $CH_2COONa$-group per unit of $C_6H_{10}O_5$. From technically-pure cellulose glycolate (NaCl-content: 2% by weight) there is prepared a solution which contains 3 parts by weight (referred to salt-free dry product) dissolved in 100 parts by weight of water. This solution is acidified with dilute hydrochloric acid and 200 parts by weight of 85% alcohol are added. There is formed a voluminous precipitation of cellulose glycolic acid, which is removed by filtration.

5 parts by weight of this swollen glycolic acid which contain about 80% by weight water and still contains neutral salt as a result of adsorption are treated with 20 parts by weight of ethylene oxide and set aside for two days at temperatures of 0–8° C. The cellulose glycolic acid does not enter into solution in this connection. The main portion of ethylene oxide and water can be removed by decantation and filtering. The product is then suspended in 90 to 95% alcohol and filtered and after repeated washing with alcohol is dried to a water content of 10% by weight at temperatures of 35° C. The reaction product is soluble in water. With 50 times its quantity by weight of water, it forms a highly viscous liquid which is resistant to calcium, copper and aluminum salts. The solution exhibits excellent adhesive power and can be used for instance as paper adhesive, color agglutinate, thickener for all possible purposes, emulsifier and the like. Due to its resistance to salts of polyvalent metals, the product described is particularly well-suited for use as a thickener in textile printing.

*Example 2*

By reacting potato starch with chloroacetic acid in the presence of alkali there is obtained in accordance with the known method the sodium salt of a starch glycolic acid which contains about 0.96 $CH_2COONa$-group per $C_6H_{10}O_5$ unit. 1.3 parts by weight of this product are dissolved in 100 parts by weight of water and acidified with hydrochloric acid. After the addition of about 200 parts by weight of 85% alcohol with intensive stirring the free starch glycolic acid deposits in the form of a powder precipitate. If the precipitate is not in powder form, the stirring was not sufficiently intensive. The precipitate is filtered off; it contains about 75% by weight of water and, as a result of adsorption, a certain quantity of NaCl; 4 parts by weight of the precipitate are mixed with 7.4 parts by weight of liquid ethylene oxide and set aside for 24 hours at 0 to 8° C. The further working is the same as described in Example 1. If the dried product is stirred into 100 times its quantity of water, there is obtained a solution which has a surprisingly high viscosity for a starch derivative. The solution is resistant to calcium and copper salts and can be used for the purposes indicated in Example 1.

*Example 3*

The sodium salt of a cellulose glycolic acid containing 0.67 $CH_2COONa$-group per unit of $C_6H_{10}O_5$ is prepared in accordance with known methods. From this product there is obtained by the methods described in Example 1 a free, swollen cellulose glycolic acid containing about 90% by weight of water. 10 parts by weight of glycide are poured over 10 parts by weight of this swollen cellulose glycolic acid and the two are thoroughly mixed. The mixture is set aside for 20 hours at 18° C. whereupon a large amount of alcohol is added followed by washing and drying. The reaction product upon the addition of about 70 times its quantity of water gives a viscous solution which is resistant to calcium, copper and aluminum salts. Upon the addition of iron salts, only a very slight precipitate is formed.

*Example 4*

By reacting alkali cellulose with gaseous ethylene oxide, there is obtained in accordance with the known methods a hydroxyethyl cellulose containing about 1–2 hydroxyethyl groups per $C_6H_{10}O_5$ unit. This hydroxyethyl cellulose is further reacted in accordance with the known methods with sodium chloroacetate, obtaining the sodium salt of a hydroxyethyl cellulose glycolic acid which contains 0.55 carboxyl groups per $C_6H_{10}O_5$ unit. The sodium salt is converted by the method described in Example 1 into the swollen free acid containing about 90% by weight of water and 2% salt. 10 parts by weight of this product are mixed with 5 parts by weight of ethylene oxide and set aside for 20 hours at 0 to 8° C. The product is further treated in the manner described in Example 1. The product is dissolved in 70 times the quantity of water forming a viscous solution which is resistant to calcium, copper and aluminum salts. Only a slight precipitate is produced by iron salts.

*Example 5*

300 parts by weight of technical sodium cellulose glycolate containing about 0.6 $CH_2COONa$-group per unit of $C_6H_{10}O_5$ and having a water content of 37% and a NaCl content of about 13%, such as obtained as crude product in technical production, are introduced at about 0° C. into 3,000 parts by weight of a mixture of 60% methyl alcohol, 37% $H_2O$ and 3% HCl and allowed to stay therein with repeated stirring for 20 minutes at temperatures up to at most $+10°$ C. The cellulose glycolic acid is then squeezed dry of the methyl alcoholic aqueous hydrochloric acid and then washed while stirring four times with portions of 1000 parts by weight each of 50% aqueous methyl alcohol and thereupon with 2 portions of 1,000 parts by weight 97% methyl alcohol, whereupon it is dried in the air. There are obtained 146 parts by weight of a salt-poor cellulose glycolic acid containing 17.3% moisture, 0.39% ash, of an acid number of 158.9 and a saponification number of 168.8, the values, with the exception of the moisture content, referring to the dry substance.

A mixture of 200 parts by weight water and 1,000 parts by weight of ethylene oxide are poured in an autoclave over 146 parts by weight of this cellulose glycolic acid and set aside with occasional stirring for 30 hours at 25 to 30° C. The ethylene glycol cellulose glycolate is freed from ethylene oxide and water by expressing, the remaining ethylene oxide is possibly evaporated and the glycolate is then washed with three portions of 1,000 parts by weight each of 97% ethyl alcohol and dried in the air. There are obtained 143 parts by weight ethylene glycol cellulose glycolate containing 6.8% moisture, acid number=1.9–2.1 on the dry substance, saponification number=152.4–153 on the dry substance. This ester is insoluble in water and in ordinary organic solvents and is a valuable intermediate for further reactions.

*Example 6*

100 parts by weight cellulose glycolic acid prepared in the manner set forth in Example 5 and having about 0.6 $CH_2COOH$-group per $C_6H_{10}O_5$ unit, acid number=167.7 on the dry substance, saponification number=177.9 on the dry substance, 0.63% ash on the dry substance and 0.1% moisture are stirred with 200 parts by weight of water whereupon 800 parts by weight of liquid propylene oxide are added in an autoclave. The mixture is set aside with occasional stirring for 40 hours at 30–35° C. After the reaction, propylene oxide and water are removed by squeezing and the reaction product is thereupon washed three times with portions of 500 cc. of 97% methyl alcohol. After air drying at about 20° C., there are obtained 120 grams propylene glycol cellulose glycolate containing 11.5% moisture, acid number=3.0 to 3.6 on the dry substance, saponification number=145.1 to 146.0 on the dry substance.

The ester is insoluble in water and organic solvents and is a valuable intermediate for further reactions.

*Example 7*

500 parts by weight potato starch having a water content of about 20% are treated in a kneader with 875 parts by weight of 17% aqueous caustic soda solution for 45 minutes and thereupon 442 parts by weight of sodium chloroacetate are sprinkled, with constant kneading into the homogeneous mix. The mixture is intensively kneaded for a further 45 minutes and thereupon allowed to age for 10 hours at 40 to 50° C. The reaction product is stirred to a highly viscous paste in 3,000 parts by weight of water and thereupon acidified, the viscosity decreasing strongly. This solution is allowed to flow, with stirring, into 6 times its quantity by weight of acetone and thereupon brought to a pH of 1.5 by means of hydrochloric acid, in which connection the starch glycolic acid precipitates in a readily filterable form. The starch glycolic acid freed of acetone is washed free of salt with intensive stirring and possibly with comminution in several portions with a total amount of 5,000 parts by weight of 30% aqueous acetone and thereupon is extensively dehydrated by washing with individual portions of a total of 3,000 parts by weight of anhydrous acetone. After air-drying, 505 grams starch glycolic acid are obtained having a moisture content of 15.1%, acid number=236.3 on the dry substance and saponification number=275.8 on the dry substance.

500 parts by weight of this starch glycolic acid, which contains 0.9 to 1.1 $CH_2COOH$-group per $C_6H_{10}O_5$ unit are treated in an autoclave with 300 parts by weight of water, and stirred, whereupon 1,000 parts by weight of liquid ethylene oxide are added and the mixture is set aside for 40 hours at 25 to 30° C. with occasional stirring. Thereupon ethylene oxide and water are expressed from the reaction product, the remaining ethylene oxide is possibly evaporated followed by washing three times with individual portions of 3,000 parts by weight of 97% methyl alcohol, and air-dryed. 525 parts by weight of ethylene glycol starch glycolate containing 12.5% moisture, acid number=3.1 to 3.2 on the dry substance, saponification number=183.3 to 184.8 on the dry substance are obtained. The ester is insoluble in water and is a valuable intermediate for further reactions.

*Example 8*

50 parts by weight cellulose glycolic acid (acid number=178; saponification number=201) containing about 0.65 to 0.75 $CH_2COOH$-group per unit of $C_6H_{10}O_5$, 12.9% of water and 1.03% ash are moistened with 25 parts by weight water and heated in an autoclave at normal pressure to 40° C. with simultaneous scavenging with nitrogen. After the air has been displaced from the autoclave, 50 grams of liquid ethylene oxide which is in a separate autoclave is forced by means of nitrogen over the course of six hours into the reaction autoclave heated to 40° C. Upon entrance into the reaction autoclave, the ethylene oxide evaporates immediately and in gaseous state reacts with the free cellulose glycolic acid contained in the autoclave so that during the entire duration of the reaction only a slight excess pressure is maintained in the reaction autoclave. After the introduction of the ethylene oxide, the product is set aside for 12 hours at 40° C. and the slight excess pressure in the autoclave is let off after this period of time. The reaction product is washed four times with portions of 500 parts by volume methyl alcohol each. After drying in air, there are obtained 56 parts by weight ethylene glycol cellulose glycolate containing 8.4% moisture and with an acid number of 2.4 and a saponification number of 105.5.

Although water soluble esters are of special importance, the invention is not limited to water soluble products.

The free ether carboxylic acids of high molecular weight carbohydrates may be water soluble or not, but the water insoluble free ether carboxylic acids are preferably used. The high molecular weight carbohydrates, the ether carboxylic acids being derived from, may be water soluble or not water soluble.

The degree of polymerisation is designated by the average number of carbohydrate units being connected to a carbohydrate molecule.

We claim:
1. A high molecular weight carbohydrate ether carboxylate containing an ester group of a free cellulose glycolic acid with an epoxide selected from the group consisting of ethylene oxide, propylene oxide, and glycide.
2. A high molecular weight carbohydrate ether carboxylate containing an ester group of a free cellulose glycolic acid with ethylene oxide.

References Cited in the file of this patent

UNITED STATES PATENTS

| | | |
|---|---|---|
| 1,884,629 | Dreyfus | Oct. 25, 1932 |
| 2,116,867 | Kreimeier | May 10, 1938 |
| 2,660,563 | Banes et al. | Nov. 24, 1953 |

UNITED STATES PATENT OFFICE
CERTIFICATE OF CORRECTION

Patent No. 3,092,619 June 4, 1963

Rudolf Köhler et al.

It is hereby certified that error appears in the above numbered patent requiring correction and that the said Letters Patent should read as corrected below.

Column 3, line 13, for "through" read -- though --; line 16, for "obtains" read -- obtained --; column 5, line 72, for "0.1%" read -- 9.1% --.

Signed and sealed this 31st day of December 1963.

SEAL)
ttest:
RNEST W. SWIDER ttesting Officer

EDWIN L. REYNOLDS

Acting Commissioner of Patents